United States Patent [19]
Haass

[11] 4,052,556
[45] Oct. 4, 1977

[54] CIRCUIT ARRANGEMENT FOR BALANCING A TWO WIRE FULL DUPLEX DATA TRANSMISSION SYSTEM

[75] Inventor: Adolf Haass, Munich, Germany

[73] Assignee: Siemens Aktiengesellschaft, Munich, Germany

[21] Appl. No.: 625,869

[22] Filed: Oct. 28, 1975

[30] Foreign Application Priority Data

Nov. 14, 1974 Germany .............................. 2454108

[51] Int. Cl.² ............................................. H04L 5/14
[52] U.S. Cl. .................................................. 178/60
[58] Field of Search .................... 178/60, 59, 58 R, 57

[56] References Cited

U.S. PATENT DOCUMENTS

| | | | |
|---|---|---|---|
| 2,341,902 | 2/1944 | Cannon et al. | 178/60 |
| 3,573,371 | 4/1971 | Carbone et al. | 178/60 |
| 3,715,496 | 2/1973 | Jones, Jr. | 178/58 R |

FOREIGN PATENT DOCUMENTS 457,776  12/1936  United Kingdom ................... 178/60

Primary Examiner—Thomas A. Robinson
Attorney, Agent, or Firm—Gerald L. Lett

[57] ABSTRACT

Apparatus is described for balancing a two wire, full duplex data transmission system. In the described system a transmitter and receiver in one station are connected to a transmitter and receiver in another station by means of two lines. The two lines carry transmitted data signals, and the transmitters in each station are connected to the receiver in the same station by a dummy circuit. The balancing operation is performed in a dummy circuit comprising a plurality of parallel-connected current paths, each path including a series combination of a time stage and an amplitude stage for adjusting the amplitude and phase relation to the data signal of subsidiary current flowing therethrough. The sum of the subsidiary currents flowing through the parallel paths from the transmitter via the dummy circuit to the receiver in the same station is adjusted to be equal to the current flowing from the transmitter via the lines to the receiver in the same station.

11 Claims, 15 Drawing Figures

CIRCUIT ARRANGEMENT FOR BALANCING A TWO WIRE FULL DUPLEX DATA TRANSMISSION SYSTEM

BACKGROUND OF THE INVENTION

This invention relates to a circuit arrangement for balancing a two wire, full duplex data transmission system, in which a transmitter and a receiver in one station are connected by two lines to a further transmitter and a further receiver in another station. The transmitters emit data signals which are transmitted through the lines to the receiver in the other station, and the transmitters are connected by a dummy circuit to their own receivers.

With a known two wire full duplex data transmission system, data are transmitted via two lines from a first station to a second station and vice versa. Each of the stations possesses a transmitter and a receiver and a plurality of impedances arranged in the form of a bridge circuit. A first and a second resistor of equal magnitude form a first and a second bridge impedance. A third bridge impedance is formed by the lines and by the components of the other station which are connected to the lines. A fourth bridge impedance is in the form of a balancing resistor and must be balanced in such manner that it is equal to the third bridge impedance. The transmitter is connected to the connection point of the first and the second bridge impedance and to the connection point of the third and the fourth bridge impedance into the bridge diagonal. The receiver is connected to the two remaining diagonal points.

In particular in the case of d.c. keying with a low transmitting level, simultaneous transmission of data in both directions is only possible, when, using the balancing impedances, the line is simulated as accurately as possible, so that during the operation of the transmitter its own receiver is not disturbed.

Prior art balancing impedances are formed from a plurality of parallel-connected time constant elements having adjustable capacitors and resistors. In the event of a change in the capacitance of one of the capacitors and in the event of a change in the resistances, not only is the time constant of the relevant time constant element altered, but also the amplitude characteristic of the balancing resistor. The mutual influence of the capacitors and resistors which are to be adjusted means that the desired balancing process is time-consuming and necessitates a long iterative procedure. Thus, this process has the disadvantage that it can only be carried out by trained personnel. The variable capacitances are generally realized with solid capacitors in combination with step switches, which necessitates a relatively large expense.

An object of the invention is to provide a circuit arrangement for balancing a two wire, full duplex data transmission system, which may be balanced more rapidly, more accurately, and with a lower cost than has been possible with prior art apparatus.

SUMMARY OF THE INVENTION

The invention is at least in part based on the recognition that the bridge circuit is balanced, not only when the balancing resistances are equal to the impedances formed by the lines, but whenever a current flowing through the lines to the receiver in the same station is equal to the current flowing through the balancing resistance to the receiver in the same station.

In accordance with the invention, the foregoing and other objects are obtained by using a plurality of parallel-connected series combinations, each of which comprises a time stage and a amplitude stage, and via which a subsidiary current of a sum current is in each case fed into the dummy circuit. The time stage emits time signals which possess a predetermined phase relationship to an edge of the data signal, and the time signals determine the beginning and the end of the subsidiary currents. The amplitude stages emit amplitude signals whose amplitudes are adjustable, and which determine the amplitudes of the subsidiary currents in such manner that the sum current flowing from the transmitter via the dummy circuit to the receiver in the same station is equal to the current flowing from the transmitter via the lines to the receiver in the same station.

The circuit arrangement in accordance with the invention is characterized in that the balancing of the currents which flow from the transmitter via the lines to the receiver in the same station, and from the transmitter via the dummy circuit to the receiver in the same station can be carried out more simply than the balancing of two voltages in bridge impedances.

The balancing technique according to the invention is also easier since the duration and the phase state of the time signals can be selected in such manner that in the event of changes in the adjustable amplitudes, the sum signal changes only in one single interval, and in all the other intervals either does not change or changes only slightly.

The time stages of the series combinations can be arranged either at the transmitter end or at the receiver end. If the time signals are produced in digital fashion, it is advantageous to arrange the time stages at the transmitter end and the amplitude stages at the receiver end. If the time signals are produced in analog fashion, it is advantageous for the amplitude stages to be arranged at the transmitter end and for the time stages to be arranged at the receiver end. The subsidiary currents which flow through the series combinations can commence simultaneously shortly after an edge of the data signal and have various lengths. Subsidiary currents of this kind can be produced with overlapping time signals, in which case the control of the time stages is relatively simple. In contrast, the subsidiary currents through the series combinations can occur consecutively. Subsidiary currents of this kind are produced with non-overlapping time signals which facilitate a relatively simple control of a balancing circuit.

In a preferred exemplary embodiment, the series combinations each comprise a time constant element having a given time constant and of in each case an amplitude stage whose attenuation and/or amplification is adjustable. As predetermined time constant elements are used, and no variable capacitances are required, a circuit arrangement of this kind can be constructed with a substantially lower expense than heretofore has been the case.

The time stages can each include a resistor and a capacitor of a given capacitance. If a particularly low expense is required for the construction of the series combinations, it is advantageous for the amplitude stages to be in the form of potentiometers whose maximum resistances are at the maximum one-tenth of the resistances of the time stages.

If a particularly accurate balancing of the currents is required, it is advantageous to construct the amplitude stages from in each case one operational amplifier and a variable resistor connected in parallel, and to arrange these amplitude stages at the transmitter end. Then the time stages, comprising capacitors and resistors can be connected at the receiver end, which provides the additional advantage that d.c. currents emitted across the outputs of the operational amplifiers are not transmitted across the capacitors and therefore do not adulterate the sum current.

BRIEF DESCRIPTION OF THE DRAWINGS

In the following exemplary and preferred embodiments of the invention will be described making reference to FIGS. 1 to 15, in which identical components appearing in more than one figure have been indicated by the same references.

DETAILED DESCRIPTION OF THE PREFERRED EMBODIMENTS

Figure 1:
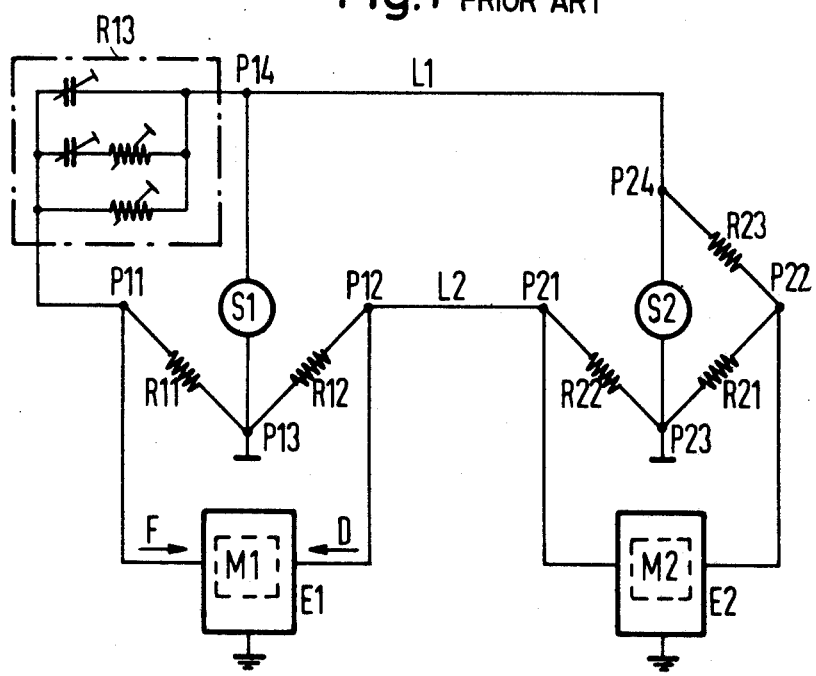
FIG. 1 is a schematic diagram of a two wire, full duplex data transmission system with a prior art balancing resistor in the dummy circuit.

By means of the data transmission system shown in FIG. 1, data can be transmitted from a first station via the lines L1 and L2 to a second station and vice versa. The first station comprises a transmitter S1, receiver E1, measuring stage M1, and resistors R11, R12, R13. The second station comprises a transmitter S2, receiver E2, measuring stage M2, and resistors R21, R22, R23. As the stations are of similar construction, in the following only one station will be described in detail.

The resistors R11 and R12 which are like values form, respectively, a first and second bridge impedance. A third bridge impedance is formed by the lines L1, L2 and by the components connected to the circuit points P21 and P24. The fourth bridge impedance is formed by the balancing resistance R13. The transmitter S1 is located in one diagonal of this bridge circuit, and the measuring stage M1 and the receiver E1 are connected to the other diagonal points. Full duplex operation through the two lines L1 and L2 necessitates that the balancing resistance R13 should as accurately as possible simulate that bridge impedance which is connected to the circuit points P12 and P14 and which, as already mentioned, is formed by the lines L1 and L2. The balancing resistance 13 shown in FIG. 1 is known per se and comprises a plurality of parallel-connected time constant elements. The balancing is effected by altering the capacitances and resistances, and presents difficlties since in the case of such changes, not only the time constants of the time constant elements, but also the amplitudes are altered.

Figure 2:
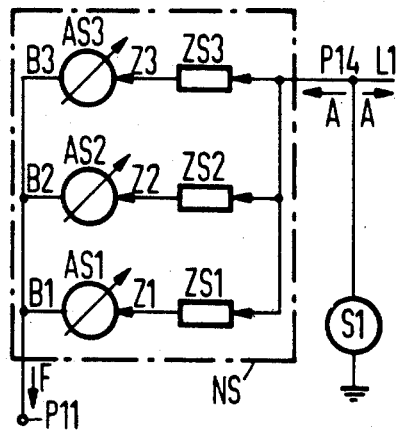
FIG. 2 is a schematic diagram of an exemplary embodiment of a balancing means with transmitting end-time stages according to the invention which can replace R13 in FIG. 1.

FIG. 2 shows a dummy circuit which comprises three series combinations of, respectively, one time stage and one amplitude stage. To simplify the drawing, this Figure and other Figures show only three series combinations, whereas in practice it can be advantageous to provide several of these series combinations. The first, second and third series combinations comprise amplitude stages AS1, AS2, AS3, respectively, and time stages ZS1, ZS2, ZS3, respectively. These series combinations are located in the balancing circuit which is formed by the transmitter S1, the circuit point P14, the series combinations, the circuit point P11 and by the receiver E1 illustrated inFIG. 1. Through the individual series combinations are conducted subsidiary currents which flow via the circuit point P11 and unite to form a sum current F within the dummy circuit. The time stages ZS1, ZS2, ZS3 emit time signals Z1, Z2, Z3 respectively, which possess a determinate phase stage in relation to an edge of the data signal A (see FIG. 4) which is emitted from the transmitter S1 to the line L1 and to the dummy circuit. The beginning and end of the subsidiary currents flowing through the series combinations are determind wih the time signals Z1, Z2, Z3.

The amplitude stages AS1, AS2, AS3 emit amplitude signals B1, B2, B3. The amplitudes of the amplitude signals are adjustable with the aid of the amplitude stages. In the balancing of the dummy circuit NS, the amplitudes of the amplitude signals B1, B2, B3 are established by the amplitude stages AS1, AS2, AS3 in such manner that the sum current F flowing from the transmitter S1 across the dummy circuit to the receiver E1 in the same station is equal to the current D flowing from the transmitter S1 via the lines L1 and L2 to the receiver E1.

Figure 3:
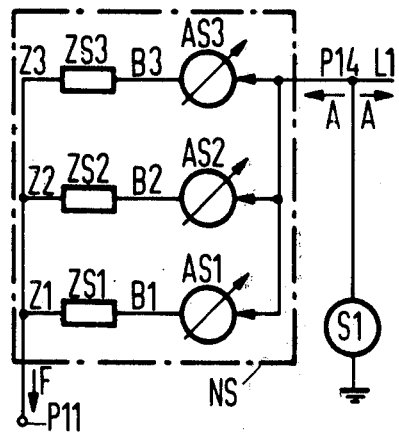
FIG. 3 is a schematic diagram of another exemplary embodiment of a dummy circuit with transmitting-end amplitude states in accordance with the invention.

The dummy circuit NS in FIG. 3 differs from the dummy circuit shown in FIG. 2 by virtue of the arrangement of the time stages and the amplitude stages. In contrast to FIG. 2, in FIG. 3 the amplitude stages AS1, AS2, AS3 are arranged on the side nearer the transmitter S1, and the time stages ZS1, ZS2, ZS3 are arranged on the side nearer the receiver E1.

Figure 4:
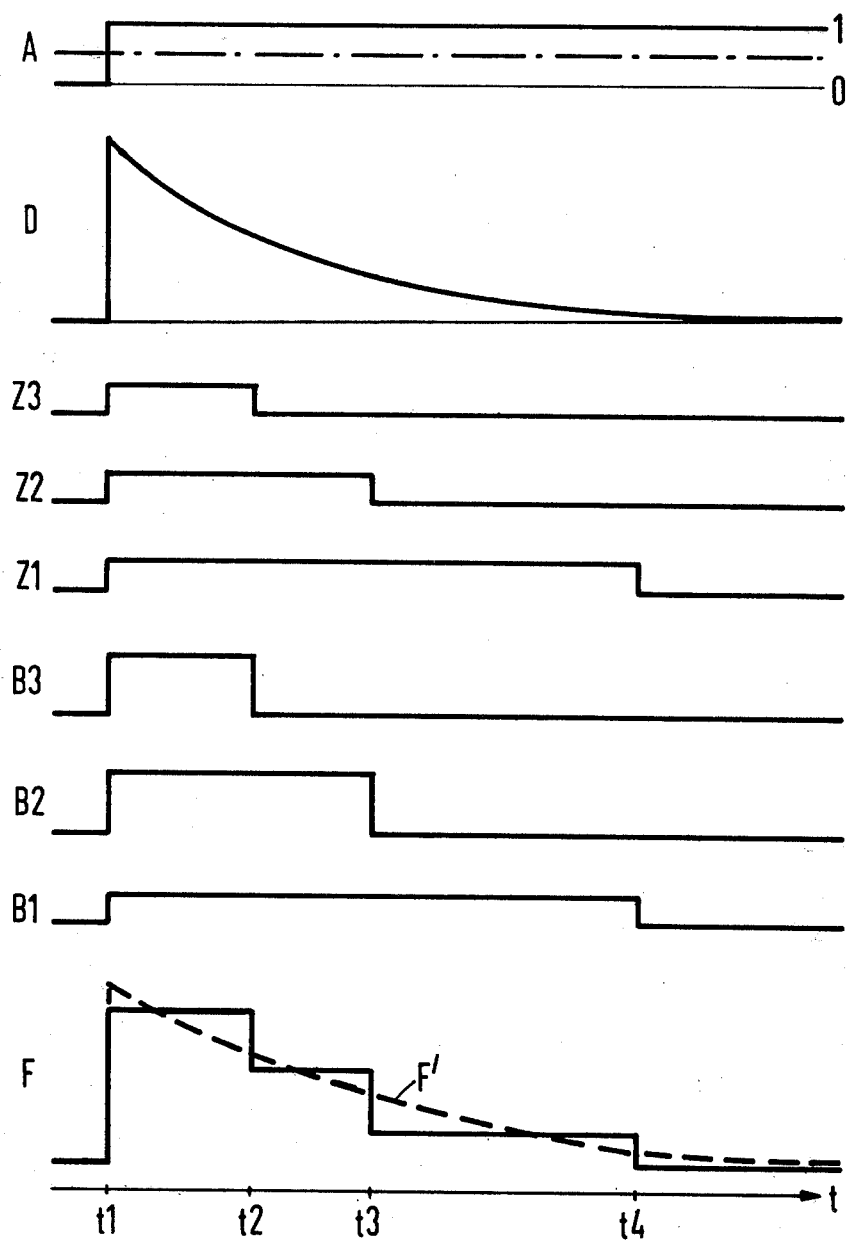
FIG. 4 is a time-waveform diagram of signals which occur when there are overlapping time signals during the operation of the circuit arrangement illustrated in FIG. 2.

FIG. 4 shows time diagrams of signals which occur during the operation of the dummy circuit in FIG. 2. The abscissa axes of these and all the other time diagrams relate to the time $t$. The double current signal A is emitted, as a data signal, from the transmitter S1 and is conducted to the line L1 and to the dummy circuit. Of the signal A, only the leading edge which occurs at the time $t1$ is shown. It will be assumed that the trailing edge of the signal A occurs at a time which is not shown. The lines L1 and L2 illustrated in FIG. 1 are capacitively coupled in a manner not shown, so that as a result of the transmitted signal A, the deformed signal D arrives at the receiver E1. As the signal A emitted from the transmitter S1 is not to act as an interference in the receiver E1, the dummy circuit NS produces sum current F in such manner that it compensates the current D. With the time stages, the time signals Z1, Z2, Z3 are produced, and commence shortly after the occurrence of the leading edge of the signal A at the time $t1$, and end at different times $t2$, $t3$, and $t4$. The time signals thus overlap in this case. Using the amplitude stages, the amplitude signals B1, B2, B3 are produced, and they have a duration equal to the duration of the assigned time signal and an amplitude which is adjustable. These amplitude signals B1, B2, B3 are fed into the dummy circuit as subsidiary currents so that the sum signal F (shown in a solid line) is produced. The greater the number of series combinations, the more accurately is a signal F′ approximated with the sum signal; signal F′ is shown in broken lines in FIG. 4, and when the balancing process is complete, it is to be equal to the signal D.

Figure 5:
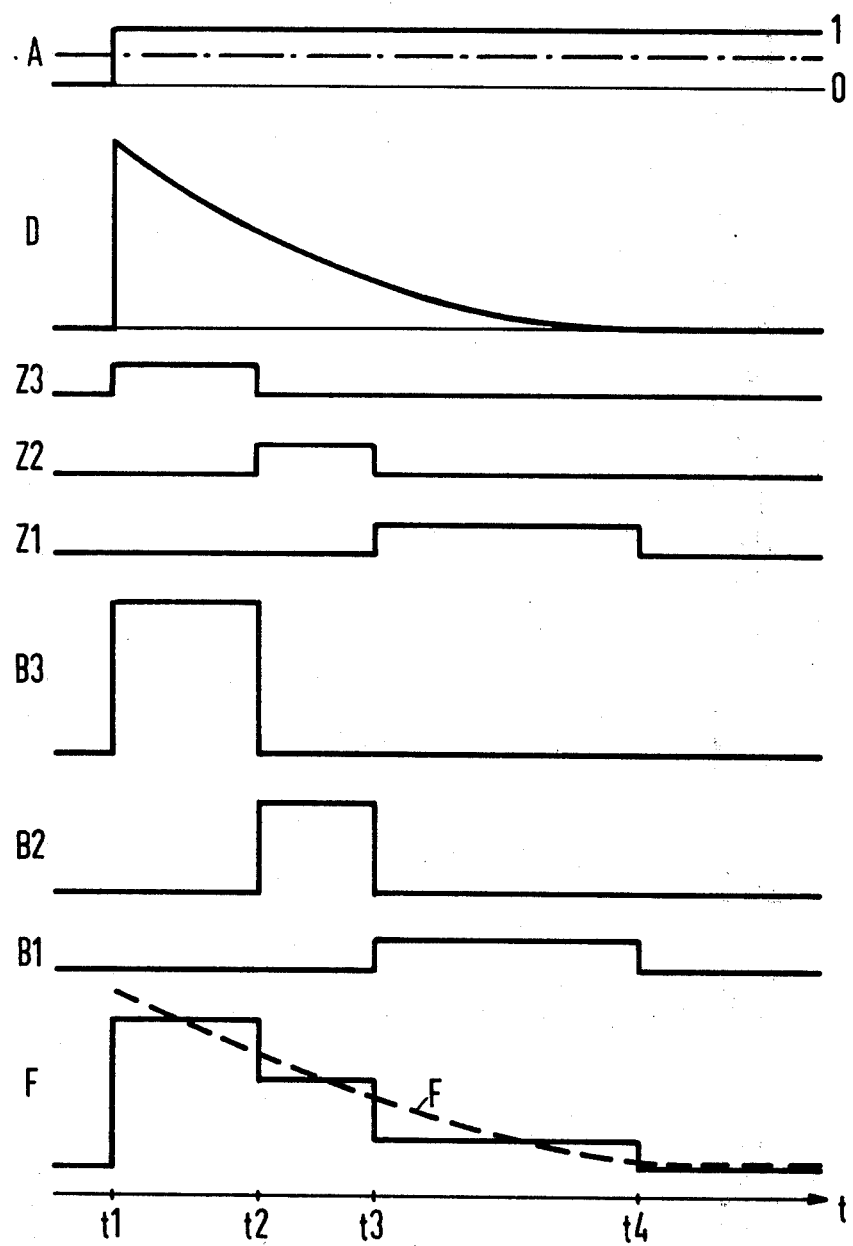
FIG. 5 is a time-waveform diagram of signals which occur when there are non-overlapping time signals during the operation of the circuit arrangement in FIG. 2.

The signals A, D, F, F′ in FIG. 5 are identical to the corresponding signals in FIG. 4. In accordance with FIG. 5, however, the time signals Z1, Z2, and Z3 do not overlap. Each of these time signals Z1, Z2 and Z3 and the corresponding amplitude signals B1, B2, B3 relate to separate intervals $t3$–$t4$, $t2$–$3$, and $t1$–$t2$, respectively. The amplitude signals B1, B2, B3 illustrated in FIG. 5 are also to be considered as subsidiary currents of the sum current F.

Figure 6:
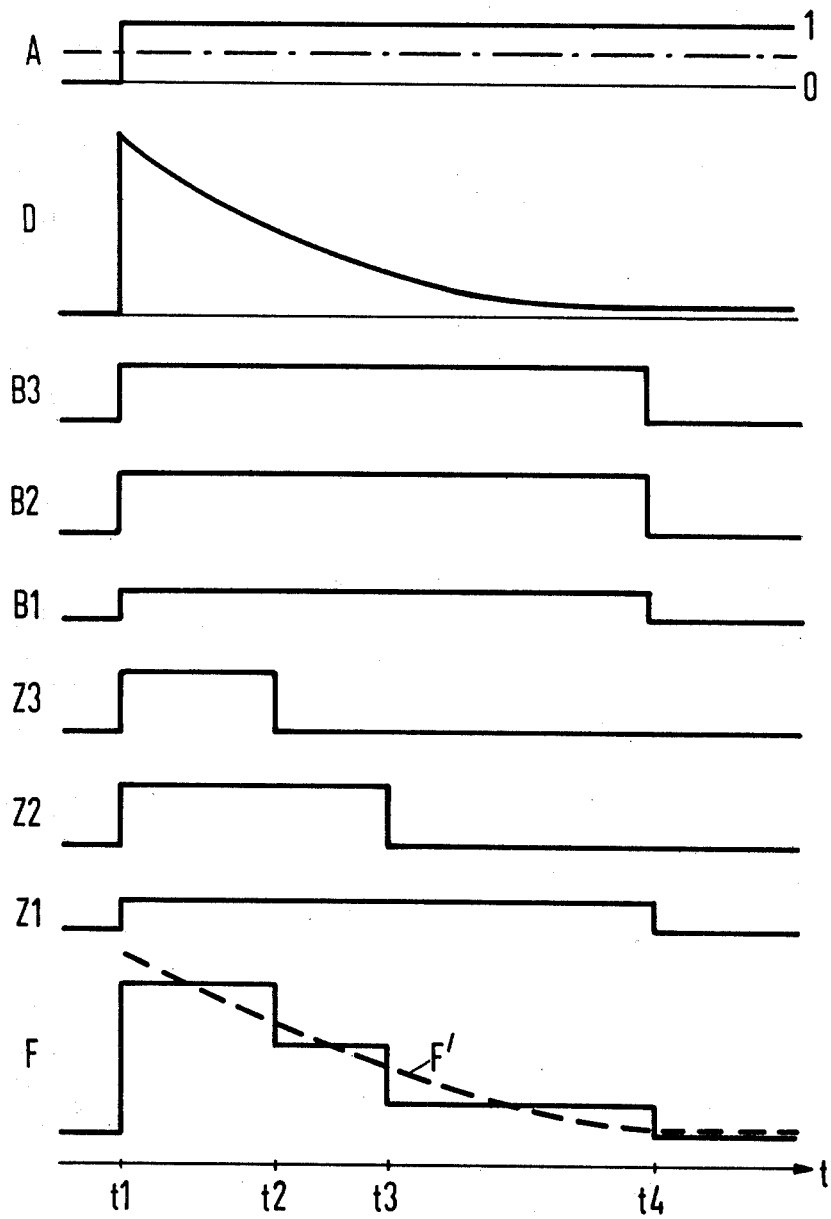
FIG. 6 is a time-waveform diagram of signals which occur when there are overlapping time signals during the operation of the circuit arrangement shown in FIG. 3.

The signals shown in FIG. 6 relate to the situation represented in FIG. 3, in which, in constrast to the situations shown in FIGS. 2, 4 and 5, firstly the amplitude signals B1, B2 are obtained and only then are the time signals Z1, Z2 and Z3 produced. In particular, in accordance with FIG. 6, three amplitude signals are produced which commence at the time $t1$, overlap one another, and whose amplitude is adjusted by the amplitude stages. The time elements ZS1, ZS2, ZS3, shown by FIG. 3, by means of time selection, operate to allow only a part of the signals B1, B2, B3 through, so that the corresponding time signals Z1, Z2, Z3 are produced. These time signals shown in FIG. 6 are to be considered as subsidiary currents of the sum current F.

Figure 7:
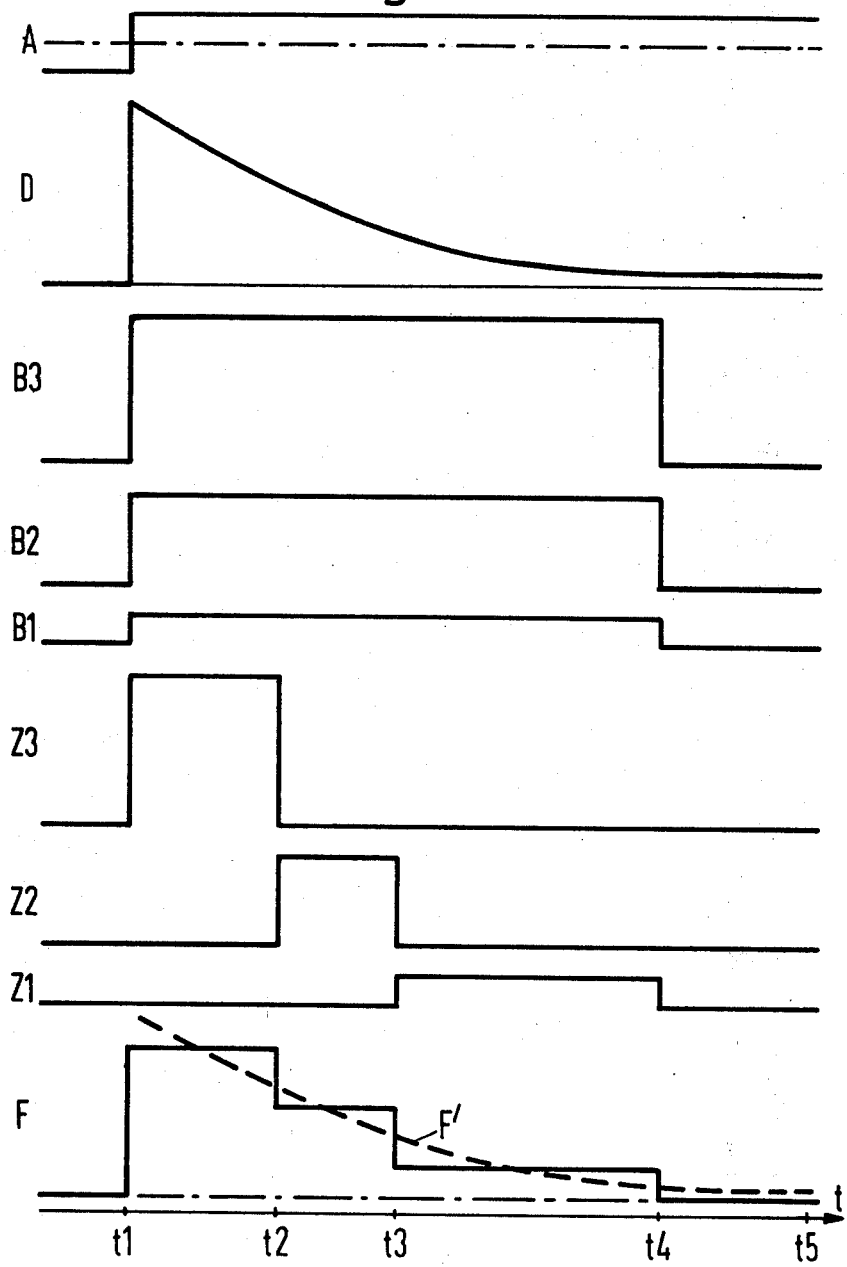
FIG. 7 illustrates time-waveform diagrams of signals which occur when there are non-overlapping time signals during the operation of the circuit arrangement illustrated in FIG. 3.

The signals illustrated in FIG. 7 relate to the apparatus in FIG. 3, in which, however, in constrast to FIG. 6, time signals Z1, Z2, Z3 which do not overlap in time are obtained. The signals Z1, Z2, Z3 in FIG. 7 are to be considered as subsidiary currents of the sum current F which flows through the circuit point P11 in FIG. 3. In contrast to FIG. 6, the amplitude signals B1, B2, B3 illustrated in FIG. 7 possess amplitudes which are equal to the amplitudes of sum signal within the corresponding interval.

Figure 8:
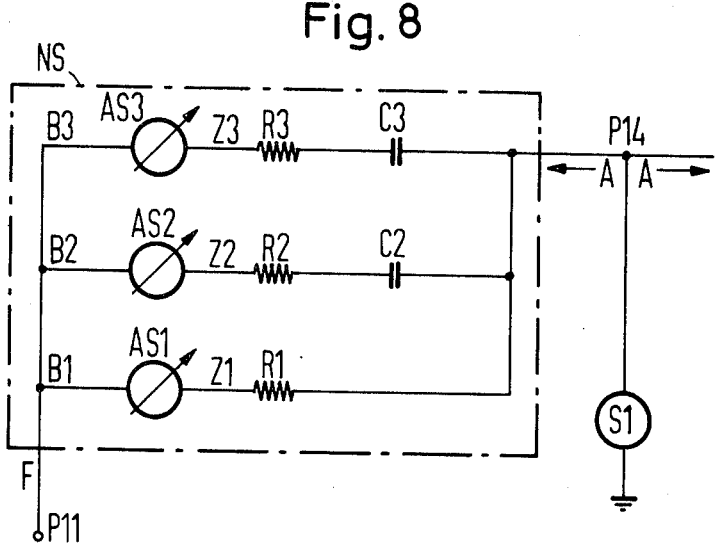
FIG. 8 is a schematic diagram of a dummy circuit according to the invention whose time stages are constructed from RC elements.

FIG. 8 shows a dummy circuit using RC elements as time stages. In particular, the resistor R1, the resistor R2 and the capacitor C2, and the resistor R3 and the capacitor C3 each form a time stage which emits a time signal Z1, Z2, Z3, respectively, to the amplitude stages. These amplitude stages facilitate an adjustable amplification and/or attenuation of the time signals with which they are supplied. The dummy circuit illustrated in FIG. 8 operates in accordance with the principle described with reference to FIGS. 2 and 4.

Figure 9:
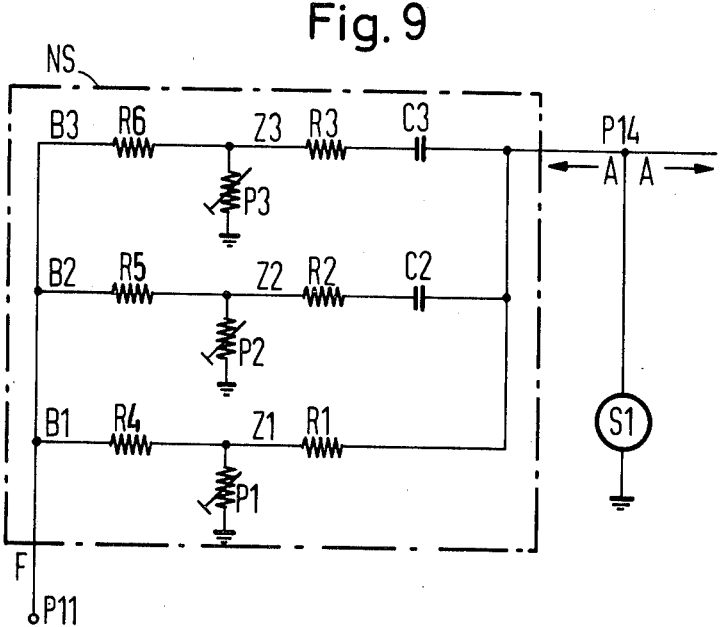
FIG. 9 is a schematic diagram of a dummy circuit according to the invention whose amplitude stages are constructed from potentiometers and resistors.

The dummy circuit illustrated in FIG. 9 also operates in accordance with the principle described with reference to FIGS. 2 and 4, and here the amplitude stages are each formed by a potentiometer P1, P2, P3 and by a resistor R4, R5, R6, respectively. In contrast to the binary time signals and binary amplitude signals shown in FIGS. 4 to 7, analog time signals and analog amplitude signals are produced with the dummy circuits illustrated in FIGS. 8 and 9.

Figure 10:
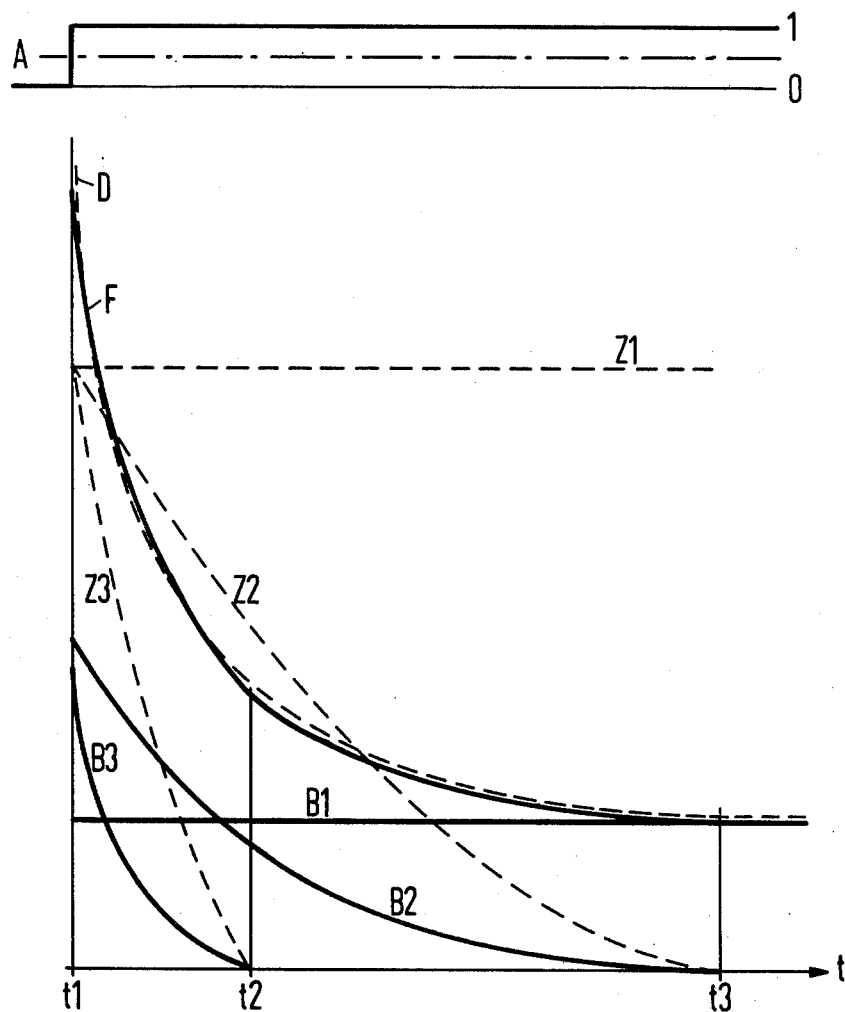
FIG. 10 is a time-waveform diagram for the operation of the dummy circuits represented in FIGS. 8 and 9.

FIG. 10 illustrates diagramatically the analog time signals Z1, Z2, Z3 which are produced with the illustrated RC elements and are subsequently conducted to the amplitude stages. The time signals overlap one another, but all commence at the time $t1$, i.e., after the occurrence of the leading edge of the signal A. It will be assumed that different attenuations are to be set with the amplitude stages AS1, AS2, AS3 in FIG. 8 and with the potentiometers P1, P2, P3 in FIG. 9, so that the amplitude signals B1, B2, B3 possess smaller amplitudes than the corresponding time signals. The amplitude signals B1, B2, B3 in FIG. 10 are to be considered as subsidiary currents of the sum current F which is substantially identical to the signal D, which is shown in broken lines and which arrives at the receiver E1 in FIG. 1.

Figure 11:
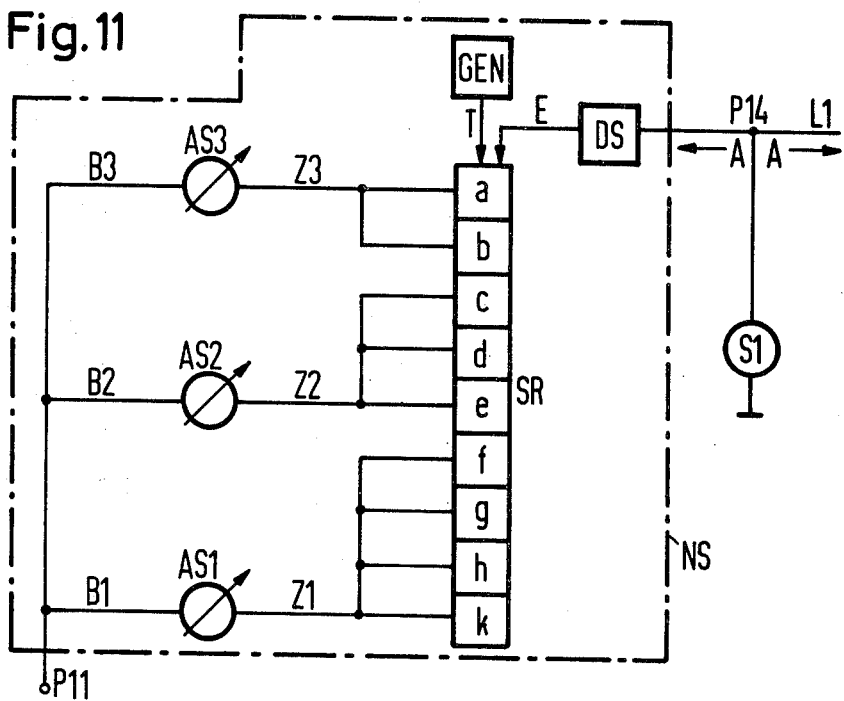
FIG. 11 is a schematic diagram of dummy circuit according to the invention whose time stages are constructed with a shift register.
Figure 12:
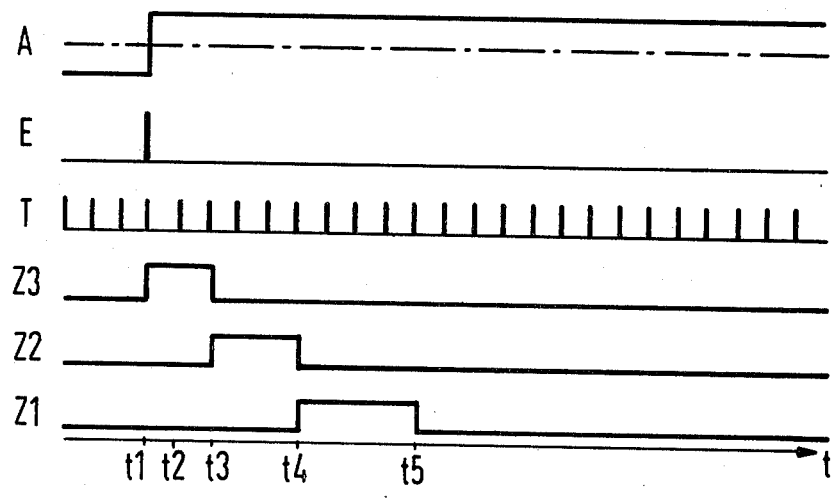
FIG. 12 illustrates time-waveform diagrams of signals which occur during the operation of the circuit arrangement shown in FIG. 11.

FIG. 11 shows a dummy circuit in which the time stages are constructed using a shift register. The time diagrams illustrated in FIG. 12 explain the mode of operation of the circuit arrangement. The first cell a of the shift register SR is connected by an input to a generator GEN via which the shift pulses T are conducted. A second imput of the first cell a is connected to the output of a differentiator stage DS, across which the signal E is emitted at the time $t1$ on the occurrence of the leading edge of the signal A. If the two binary states are referenced 0 and 1, and if the two states which can be assumed by the individual cells of the shift register are designated, accordingly, as 0-state and 1-state, then it may be assumed that prior to the time $t1$ all the cells of the shift register SR assume their 0-state and emit 0-signals to the amplitude stages AS1, AS2, AS3. At the time $t1$, the first cell SR1 is changed from its 0-state into its 1-state, and now, from the time $t1$ onwards, emits a 1-signal to the amplitude stage AS3. With the next pulse of the signal T, at the time $t2$, the cell $b$ of the shift register SR is brought into the 1-state, so that now a 1-signal is again emitted to the amplitude state AS3. The two 1-signals of the cells $a$ and $b$ together form the time signal Z3. After the time $t3$, the cells $a$ and $b$ reassume the 0-state, and the cell $c$ is changed into its 1-state, so that the leading edge of the time signal Z2 is formed. Then the cells $d$ and $e$ are successively set into their 1-states, so that the time signal Z2 is emitted to the amplitude stage AS2. At the time $t4$, the cell $f$ is brought into its 1-state, and the other cells $g$, $h$, $k$ are in turn brought into their 1-states, to that the time signal Z1 is produced. Thus, these time signals are produced in accordance with the principle described with reference to FIGS. 2 and 5.

Figure 13:
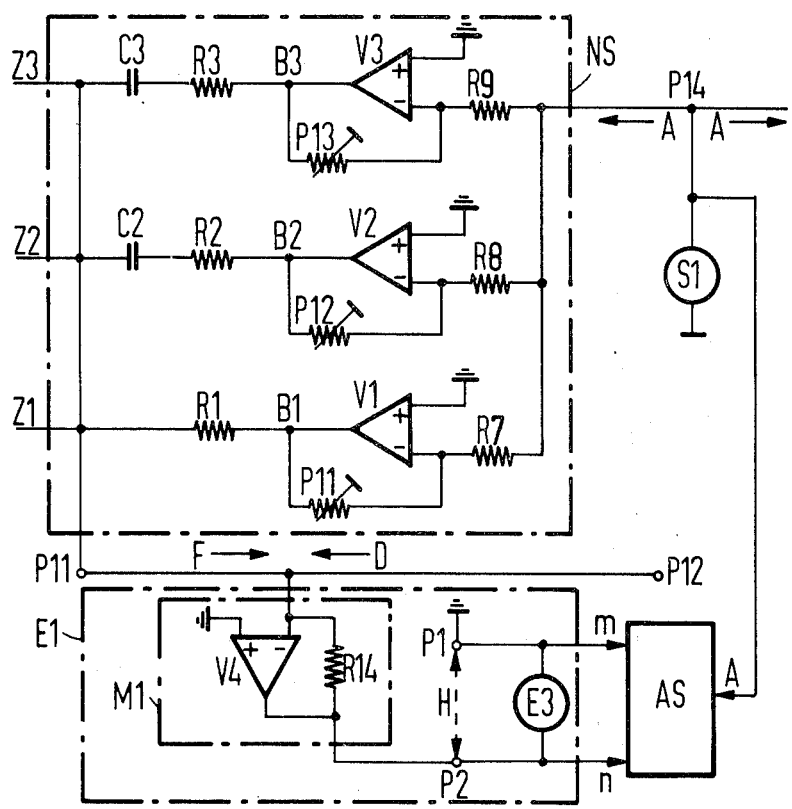
FIG. 13 is a schematic diagram of a dummy circuit according to the invention whose amplitude stages are constructed with operational amplifiers and whose time stages are constructed with RC elements.

FIG. 13 illustrates another dummy circuit NS which operates in accordance with the principle described with reference to FIGS. 3 and 7. In this case the amplitude stages are each formed by an operational amplifier V1, V2, V3, a potentiometer P11, P12, P13 and a resistor R7, R8, R9. The time stages are in each case formed by a RC element. Each of these operational amplifiers possesses an input marked with a plus sign which is connected via a non-inverting channel to the output, and an input marked with a minus sign which is connected via an inverting channel to the output. The amplification of each operational amplifier is set with the aid of the potentiometers P11, P12, P13. The time constant elements R1, and R2/C2 and R3/C3 are again set with a predetermined time constant.

FIG. 13 also gives a more detailed illustration of the measuring stage M1 by which measuring signals are obtained which are dependent upon the difference between the currents which flow from the circuit point P11 and from the circuit point P12 to the operational amplifier V4. In particular the voltage H tapped across the resistor R14 is to be considered as a measuring signal.

The dummy circuit NS is balanced in such manner that the signal H is negligibly small whenever either the transmitters S1 and S2 illustrated in FIG. 1 transmit no data signals, or when only the transmitter S1 in the specific station transmits a data signal. Thus, the transmitter S1 does not disturb the receiver E1 in its own station. If the transmitter S2 in the other station transmits a data signal, the currents F and D differ from one another, so that the amplitude of the signal H assumes a specific value and signals the data transmitted from the transmitter S2 to the receiver E1. It will be assumed that this actual data reception is carried out in known manner using the device E3.

The operational amplifiers V1, V2, V3 are to emit a signal having a level of zero from their outputs whenever the signals present at their inputs are equal. Although the operational amplifiers which are actually available to a large extent fulfill this condition, their output voltages are subject to a small error (offset voltage). To prevent these errors from influencing the sum signal F, it is favorable to arrange the operational amplifiers V2 and V3 on the side of the transmitter S1, and the capacitors C2 and C3 on the side of the receiver E1, since these capacitors C2 and C3 suppress the errors.

Figure 14:
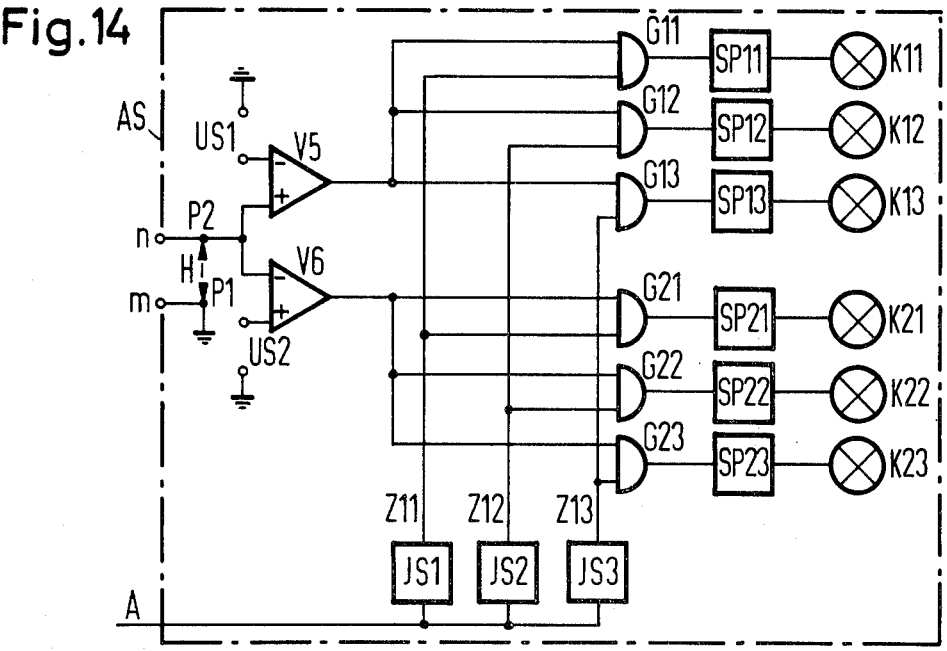
FIG. 14 is a schematic diagram illustrating a balancing circuit according to the invention.
Figure 15:
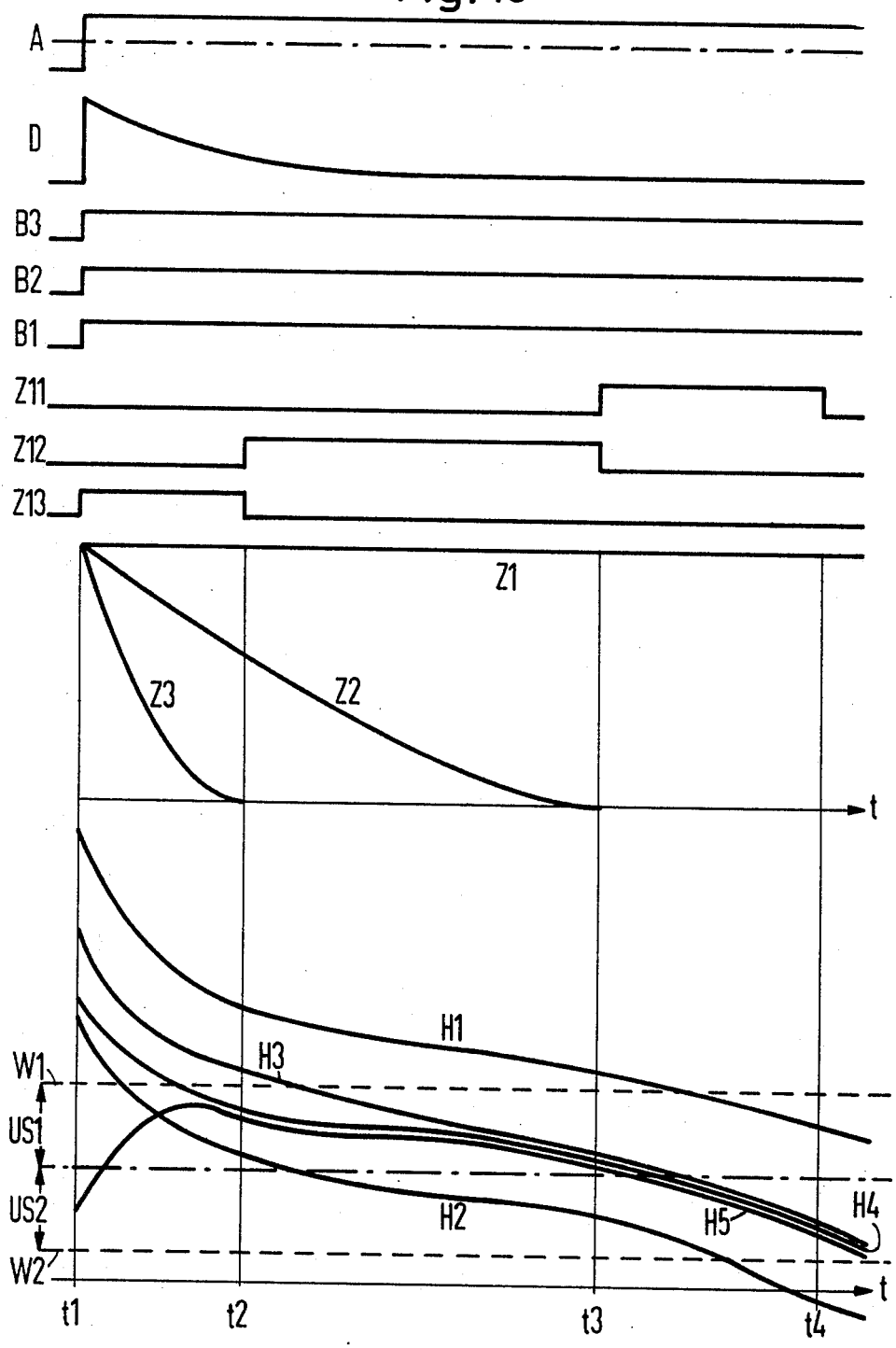
FIG. 15 shows time-waveform diagrams illustrating signals which occur during the operation of the balancing circuit shown in FIG. 14.

FIG. 14 shows the balancing circuit AS which is also schematically shown in FIG. 13. The signal H which signals the difference between the currents F and D is conducted across the inputs m and n. FIG. 15 represents variants of the signal H, and also the two threshold values W1 and W2 which are set with the aid of the operational amplifiers V5 and V6. The balancing circuit comprises AND gates G11, G12, G13, G21, G22, G23, stores SP11, SP12, SP13, SP21, SP22, SP23, control lamps K11, K12, K13, K21, K22, K23 and interval stages JS1, JS2, JS3.

It will be assumed that the transmitter S1 shown in FIG. 1 periodically emits the signal A which possesses a leading edge which occurs at the time $t1$, and a non-illustrated trailing edge. The dummy circuit NS illustrated in FIG. 13 is not balanced, as indicated by the signal H1 which exceeds the threshold value W1. This overshooting of level is signalled with the aid of the operational amplifiers V5 and V6, which emit a 1-signal and a 0-signal, respectively, via their outputs. It will be assumed that the interval stages JS1, JS2, JS3 each emit the signals Z11, Z12, Z13, respectively, which, together with the 1-signal of the operational amplifier V5, open the gates G11, G12, G13 during the intervals $t3$–$t4$, and $t2$–$t3$ and $t1$–$t2$, respectively, so that the stores SP11, SP12, SP13 are set from their rest state into their operative state, and the control lamps K11, K12, K13 light up. After the time $t4$, the stores SP11, SP12, SP13 are periodically reset into their rest state.

With the aid of the potentiometer P11 shown in FIG. 13, the level of the signal B1 is reduced until the control lamp K11 lights up, and the signal H2 is formed. It will be assumed that the level of the signal B1 has been reduced to such an extent that a 1-signal is emitted from the output of the operational amplifier V6, and thus now, in cooperation with the 1-signal of the signal Z11, the Store SP21 is set in the operative state, and the control lamp K21 signals the undershooting of the threshold value W2 in the interval $t3$–$t4$. In order to initially set the level of the signal F during the interval $t3$–$t4$, the potentiometer P11 is turned back until the control lamp K21 is extinguished with the signal H3. The dummy circuit NS is thus balanced for the time interval $t3$–$t4$.

However, the control lamps K12 and K13 are still illuminated and indicate that the dummy circuit has not yet been balanced for the remaining time intervals. Now, the potentiometer P12 is adjusted, and the signal B2 is modified in such manner that with the signal H4 the control lamp K12 is extinguished. Thus, the dummy circuit NS is also balanced for the second time interval $t2$–$t3$. The control lamp K13 now indicates that the signal H4 is overshooting the threshold value W1 during the interval $t1$–$t2$. Therefore, the potentiometer P13 is used to change the level of the signal B3 until the control lamp K13 is extinguished with the signal H5. Thus, the dummy circuit NS is also balanced in the interval $t1$–$t2$.

Thus, the control lamps K11, K12, K13, K21, K22, K23 directly indicate in which time interval an adjustment must be effected using one of the potentiometers P11, P12, P13. Therefore, the balancing process can be carried out in a fraction of the time previously required when the dummy resistor R13 shown in FIG. 1 is used, without the need for expensive measuring equipment and trained personnel.

The principles of the invention are described hereinabove by describing alternate preferred embodiments constructed and operating according to those principles. It will be apparent to those skilled in the art that the described embodiments can be modified or changed in a variety of ways while remaining within the scope of the invention as defined by the appended claims.

I claim:

1. In a two wire, full duplex data transmission system wherein a transmitter and receiver in one station are connected by two wires to a transmitter and receiver in another station, the transmitter in each station being connected by means of a balancing apparatus to the receiver therein for adjusting the value of the current from the transmitter flowing through said two wires to the receiver in the same station to be equal to current flowing from the transmitter directly to the receiver in said another station, the balancing apparatus comprising.

a plurality of parallel-connected current paths, each comprising a series combination of a time stage and an amplitude stage, said parallel-connected current paths being connected to received current from the transmitter in the same station, a plurality of subsidiary currents flowing through said parallel current paths to a common output terminal which couples a sum current of said subsidiary currents to the receiver in the same station, each said time stage being constructed to produce predetermined, but different, timing signals in relation to a data signal being transmitted from the station, said amplitude stages being constructed to adjust the values of said subsidiary currents flowing therethrough and said time and amplitude stages having a connected relationship such that each said amplitude stage is effective for a duration determined by the timing signal from the associated time stage.

2. The balancing apparatus defined in claim 1 wherein the inputs of said time stages are connected to the transmitter in the same station and the outputs of said time stages are connected to inputs of said amplitude stages, the outputs of said amplitude stages being connected to said output terminal.

3. The balancing apparatus defined in claim 1 wherein inputs of said amplitude stages are connected to said transmitter and outputs of said amplitude stages are connected to inputs of said time stages, the outputs of said time stages being connected to said output terminal.

4. The balancing apparatus defined in claim 1 wherein said time stages are connected to operate responsively to the data signal and operate to emit time signals which commence simultaneously and have different durations.

5. The balancing apparatus defined in claim 1 wherein said time stages are connected operate responsively to the data signal and operate to emit a sequence of time signals which do not overlap, the first of said time signals occurring after the occurrence of the leading edge of the data signal.

6. The balancing apparatus defined in claim 3 wherein said amplitude stages produce amplitude signals of equal duration.

7. The balancing apparatus defined in claim 1 wherein each said time stage comprises a RC circuit have a predetermined time constant.

8. The balancing apparatus defined in claim 7 wherein each said amplitude stage comprises a series resistor connected to a parallel potentiometer, the maximum resistances of said potentiometers being no greater than one-tenth of the values of the resistances in said time stages.

9. The balancing apparatus defined in claim 1 wherein said time stages comprise:

a shift register having a sequence of cells which assume a rest state or an operative state, the rest state being assumed before the occurrence of the data signal, a pulse generator connected to the first cell in said sequence for emitting pulses to advance an item of information through said shift register, the outputs of said cells being connected, respectively, to amplitude stages in different ones of said current paths, differentiator means for receiving the data signal from the transmitter and for coupling the data signal to said first cell upon the occurrence of a leading edge of said data signal.

10. The balancing apparatus defined in claim 1 wherein each said amplitude stage comprises:

an operational amplifier having an output, an inverting input and a non-inverting input, said non-inverting input being connected to a reference potential, a potentiometer connecting said inverting input to said output of said operational amplifier, and a resistance connecting said inverting input to the transmitter.

11. The balancing apparatus defined in claim 1 further comprising:

first threshold circuit means for producing a first binary signal when a measuring current dependent said sum current and the current flowing into said receiver from a said wire exceeds a first threshold value, second threshold circuit means for producing a second binary signal when said measuring current undershoots a second threshold value, a source of time signals, responsive to the data signal, a first group of AND gates, each gate having one input connected to said time signal source and another input connected to the output of said first threshold circuit means, a second group of AND gates, each having one input connected to said timing signal source and another input connected to the output of said second threshold circuit means, first and second groups of stores, the inputs of said first group of stores being connected, respectively, to outputs of said first group of AND gates and inputs of said second group of stores being connected, respectively, to outputs of said second group of AND gates, indicating means operable responsive to the binary states of said stores for indicating which of said stores are in an operative state.

* * * * *